(12) United States Patent
Coutu et al.

(10) Patent No.: US 7,154,245 B2
(45) Date of Patent: Dec. 26, 2006

(54) METHOD TO PREVENT MIDRANGE RESONANCE DURING OPERATION OF A MULTI-PHASE STEP MOTOR

(75) Inventors: David Coutu, East Hampton, CT (US); Robert A. Fournier, Newington, CT (US)

(73) Assignee: IMS Inc., Malborough, CT (US)

(*) Notice: Subject to any disclaimer, the term of this patent is extended or adjusted under 35 U.S.C. 154(b) by 0 days.

(21) Appl. No.: 11/311,867

(22) Filed: Dec. 20, 2005

(65) Prior Publication Data

US 2006/0108965 A1    May 25, 2006

Related U.S. Application Data

(63) Continuation-in-part of application No. 10/689,828, filed on Oct. 22, 2003, now abandoned.

(51) Int. Cl.
*H02P 8/00* (2006.01)
(52) U.S. Cl. ............... 318/696; 318/685; 318/701
(58) Field of Classification Search ............... None
See application file for complete search history.

(56) References Cited

U.S. PATENT DOCUMENTS

| 4,339,701 A | * | 7/1982 | Pritchard ............. 318/696 |
| 5,779,450 A | * | 7/1998 | Fujiwara et al. ......... 417/45 |
| 6,208,107 B1 | * | 3/2001 | Maske et al. ........... 318/685 |
| 6,903,531 B1 | * | 6/2005 | Suomi et al. ........... 318/696 |

OTHER PUBLICATIONS

The American Heratige Dictionary of the English Language, Fourth edition Copyright 2000 by Houghton Mifflin Company Published by Houghtin Mifflin company.*

* cited by examiner

*Primary Examiner*—Lincoln Donovan
*Assistant Examiner*—Renata McCloud

(57) ABSTRACT

The frequency of the pulse width modulator within a step motor control circuit is increased above a base frequency under defined conditions to enable more accurate construction of the phase current waveform for preventing mid-range resonance. The PWM frequency is stepped between frequencies by a fixed amount above the base frequency, to prevent the excitation of system harmonics and prevent step motor operational instability.

1 Claim, 2 Drawing Sheets

METHOD TO PREVENT MIDRANGE RESONANCE DURING OPERATION OF A MULTI-PHASE STEP MOTOR

Continuation in Part of U.S. patent application Ser. No. 10/689,828 filed Oct. 22, 2003.

BACKGROUND OF THE INVENTION

Step motor systems sometimes experience an operational instability known as "mid-frequency" or "mid-range" resonance.

This instability which often causes loss of motor torque and leads to motor stall, is caused by an interaction between the step motor drive, power supply and step motor load. When observing the step motor phase current, the shape and magnitude thereof are unstable.

Previous methods to prevent mid-range resonance include modifications to the power supply, connection of choke coils to the step motor and circuits designed to produce signals indicative of error. The drawbacks to these methods lie in the extra complexity involved. These methods also may need to be tuned to the specific system of step motor, step motor drive, power supply and load U.S. Pat. No. 5,264,770 entitled "Stepper Motor Driver Circuit"; "U.S. Pat. No. 4,675,590 entitled "Stepping Motor Driver with Mid-frequency Stability Control" and U.S. Pat. No. 4,319,175 entitled "Stabilized Stepping-motor System" each describe early circuits relating to step motor controllers.

One purpose of the present invention is to reduce midrange resonance in a multiphase step motor for improved step motor performance.

SUMMARY OF THE INVENTION

The frequency of the pulse width modulator, "PWM", within a step motor control circuit is increased above a base frequency under defined conditions to enable more accurate construction of the phase current waveform for preventing mid-range resonance. The PWM frequency is stepped between frequencies by a fixed amount above the base frequency, to prevent the excitation of system harmonics.

The PWM is synchronized to the incoming step input once per cycle to prevent the motor step clock from 'beating' against the PWM frequency. Improved current control leads to less phase current lag resulting in greater stability.

DESCRIPTION OF THE PREFERRED EMBODIMENT

Figure 1:
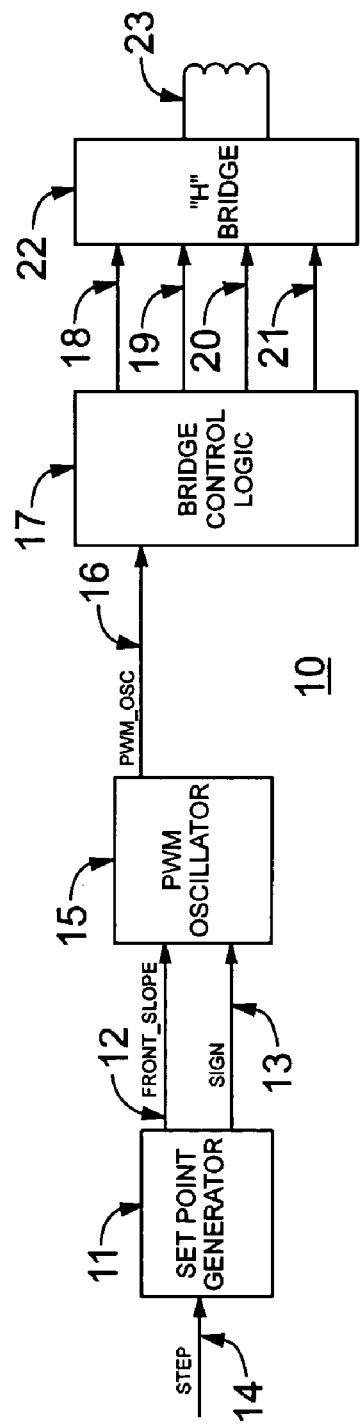
FIG. 1 is a schematic representation of the step motor control circuit in accordance with the invention.

The SET POINT GENERATOR 11, within the step motor control circuit 10 of FIG. 1, creates a FRONT_SLOPE current signal 24 (FIG. 2) on conductor 12 and a SIGN current signal 29 (FIG. 2) on conductor 13 in response to the STEP signal input on conductor 14. The FRONT_SLOPE signal on conductor 12 occurs when the SIGN signal is present on conductor 13 and the STEP signal on conductor 14 causes the step motor phase current to increase for one quarter of a cycle.

These signals connect to and influence the operation of a PWM OSCILLATOR, "PWM_OSC" 15 that creates the PWM_OSC signal 30 (FIG. 2) on conductor 16. These signals, along with others (not shown), are inputted to the BRIDGE CONTROL LOGIC, "LOGIC" 17. The PWM_OSC signal on conductor 16 along with others (not shown) direct the operation of the LOGIC, 17. The LOGIC 17, through conductors 18–21 operate the H BRIDGE 22 that controls the flow of step motor phase current through MOTOR PHASE COIL, "COIL" 23. Although one COIL 23 is shown, the other two COILS (not shown) are connected in a similar manner.

Figure 2:
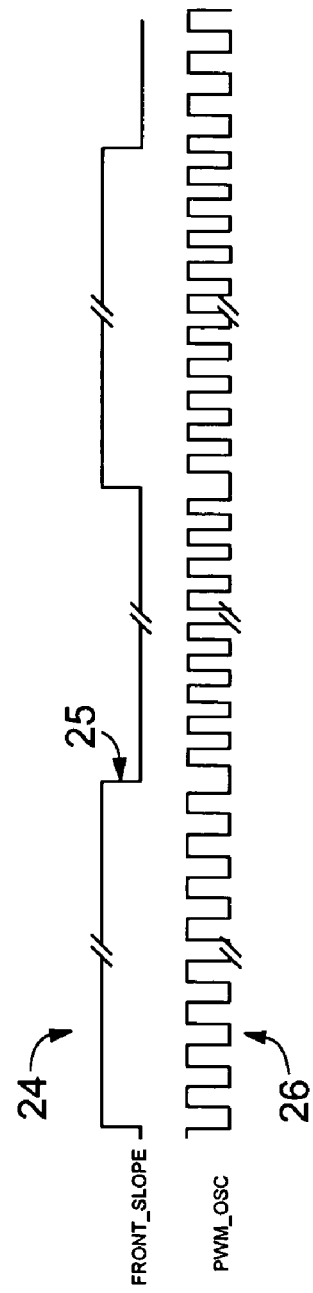
FIG. 2 is a diagrammatic representation of the signal waveforms within the circuit of FIG. 1 showing the PWM_OSC frequency change.
Figure 3:
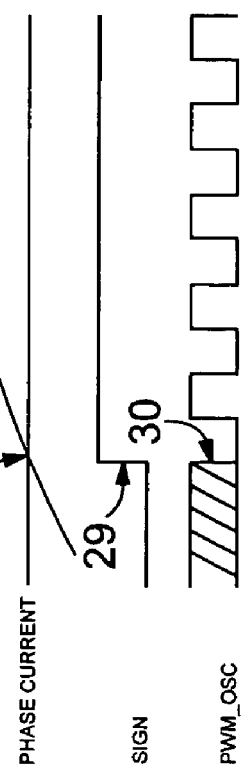
FIG. 3 is a diagrammatic representation of the signal waveforms showing the synchronization of the PWM oscillator within the control circuit of FIG. 1.

Referring now to FIGS. 1–3, the PWM_OSC 15 creates the PWM_OSC signal 27 at frequencies that range between a low or base frequency up to a specified maximum frequency. The PWM_OSC 15 starts at the base frequency and increases the frequency, if required, to maintain a specified minimum number of edges 27 of the PWM_OSC signal 26 during the FRONT_SLOPE period until the specified maximum frequency is reached. Having a minimum number of edges enables more accurate construction of the phase current for preventing mid-range resonance.

The PWM-OSC 15 counts the number of PWM_OSC edges 27 during the occasion of the FRONT_SLOPE signal 24. If there are fewer than the minimum number of edges specified and the maximum frequency has not been reached, the PWM_OSC frequency is increased by a fixed amount when the FRONT_SLOPE signal ends as indicated at 25.

If the number of edges 27 of the PWM_OSC signal 26 is greater than or equal to the number specified during the occasion of the FRONT_SLOPE signal 24, the PWM_OSC frequency is decreased by a fixed amount when the FRONT_SLOPE signal ends as indicated at 25.

When the FRONT_SLOPE signal 24 is above the base frequency and is stable or changing slowly, the PWM frequency will repetitively step between two frequencies. This step between frequencies occurs when the frequency, in one cycle, is increased creating more PWM_OSC edges 27. In the next cycle, (not shown) the number of edges 27 of the PWM_OSC signal 26 will be greater than or equal to the minimum number of edges specified, therefore causing the frequency to decrease. The frequency is increased within the each of the following cycles. The stepping between frequencies prevents the excitation of system harmonics, thereby preventing mid-range resonance.

In the case where the signal period of the FRONT_SLOPE signal 24 is decreasing rapidly, the PWM-OSC 15 will increase the frequency by a fixed amount each cycle until the maximum frequency is reached or the period of the FRONT_SLOPE signal 24 becomes stable, whichever occurs first.

In the case where the period of the FRONT_SLOPE signal 24 is increasing rapidly and the frequency of the PWM_OSC signal 26 is above the base, the PWM-OSC 15 will decrease the frequency by a fixed amount each cycle until the base frequency is reached or the period of the FRONT_SLOPE signal becomes stable, whichever occurs first.

If at the end of a cycle, the frequency of the PWM_OSC signal 26 is increased to the maximum, the frequency of the PWM_OSC signal will be decreased at the end of the next cycle, even though there may be fewer than the number of specified edges 27 of the PWM_OSC signal 26. On the following cycles, the PWM_OSC frequency is increased back to the maximum frequency. This continues the beneficial stepping between PWM_OSC frequencies even at the maximum frequency limit.

It is to be noted that the counting of PWM_OSC edges 27 could be performed during any portion of the motor operating cycle.

As shown in FIG. 3, the phase current 28 transitions through zero, as indicated in phantom, twice per cycle, although only one cycle is shown in FIG. 3. At one of the transitions, indicated by the SIGN signal 29 on conductor 13, the PWM oscillator 15 resets its frequency generator as indicated 30 thereby synchronizing the PWM oscillator to the phase current. The phase current changes in response to a step input, such that the PWM oscillator is synchronized once per sine cycle to the incoming step input. This synchronization prevents the frequency of the step input from "beating" against the PWM oscillator frequency, preventing the potential of midrange resonance. It is to be noted the synchronization could occur at any point within the sine cycle.

Figure 4:
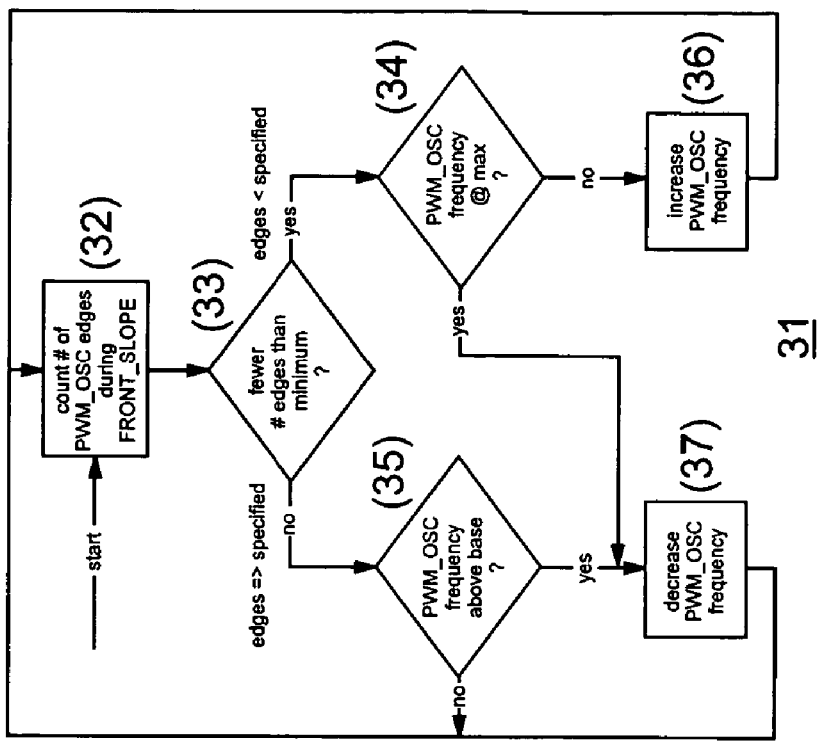
FIG. 4 is a flow chart diagram depicting the logic for changing the PWM-OSC frequency in accordance with the teachings of the invention.

A flow chart diagram 31 is depicted in FIG. 4 for controlling the LOGIC 17 of FIG. 1. A count is made of the number of PWM-OSC edges during FRONT-SLOPE (32) and a determination is made as to whether the number of PWM-OSC edges is less than a predetermined minimum (33). If the number of PWM-OSC edges is less than a predetermined minimum, a determination is made as to whether the PWM-OSC frequency is at a predetermined maximum (34). If the PWM-OSC is not at a predetermined maximum, the PWM-OSC frequency is increased (36) and the number of PWM-OSC edges during FRONT-SLOPE is re-counted (32). If the PWM-OSC frequency is at a predetermined maximum, the PWM-OSC frequency is decreased (37) and the number of PWM-OSC edges during FRONT-SLOPE is re-counted (32).

If the number of PWM-OSC edges is not less than a predetermined minimum, a determination is made as to whether the PWM-OSC frequency is above a base value (35) and if not, the number of PWM-OSC edges during FRONT-SLOPE is re-counted (32). If the PWM-OSC frequency is above a base value, the PWM-OSC frequency is decreased (37) and the number of PWM-OSC edges during FRONT-SLOPE is re-counted (37).

It has herein been shown that careful control of the PWM-OSC frequency to construct the phase current waveform in a step motor prevents mid-range resonance and eliminates motor stall.

What is claimed is:

1. A circuit for controlling the phase current waveform in a step motor comprising:

a set point generator connecting with a PWM OSCILLATOR for providing FRONT-SLOPE and SIGN data to said PWM OSCILLATOR;

a BRIDGE CONTROL LOGIC connecting with said PWM OSCILLATOR and an H BRIDGE, said BRIDGE CONTROL LOGIC thereby controlling step motor phase current through said H BRIDGE to a step motor coil to prevent occurrence of harmonics of said operating current frequency relative to said phase current waveform; wherein said controlling of said step motor phase current comprises:

providing a step motor operating current defining an operating current waveform and an operating current frequency;

connecting a pulse width modulator signal with said step motor operating current;

determining a number of edges comprising said operating current waveform;

decreasing said operating current frequency when said number of edges exceeds a predetermined value; and increasing said operating current frequency when said number of edges is less than said predetermined value.

\* \* \* \* \*